(12) United States Patent
Kusano et al.

(10) Patent No.: US 7,720,988 B2
(45) Date of Patent: May 18, 2010

(54) METHOD AND APPARATUS FOR MULTIMEDIA REPRODUCTION

(75) Inventors: Manabu Kusano, Iwaki (JP); Masatoshi Ejiri, Iwaki (JP); Shinji Wakabayashi, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 977 days.

(21) Appl. No.: 10/713,770

(22) Filed: Nov. 14, 2003

(65) Prior Publication Data

US 2004/0143624 A1 Jul. 22, 2004

(30) Foreign Application Priority Data

Nov. 14, 2002 (JP) ............................. 2002-331416

(51) Int. Cl.
*G06F 15/16* (2006.01)

(52) U.S. Cl. ........................................ 709/232; 709/203

(58) Field of Classification Search ......... 709/217–219, 709/203, 231–232; 84/600–601, 609
See application file for complete search history.

(56) References Cited

U.S. PATENT DOCUMENTS

| | | | | |
|---|---|---|---|---|
| 6,134,202 A * | 10/2000 | Tsutsui | .................... | 369/275.3 |
| 6,148,121 A * | 11/2000 | Fujimori et al. | ............. | 382/309 |
| 6,185,625 B1 * | 2/2001 | Tso et al. | ..................... | 709/247 |
| 6,259,443 B1 | 7/2001 | Williams, Jr. | | |
| 6,567,847 B1 * | 5/2003 | Inoue | .......................... | 709/219 |
| 6,643,621 B1 * | 11/2003 | Dodrill et al. | ................ | 704/275 |
| 6,949,704 B2 * | 9/2005 | Funaki | ......................... | 84/609 |
| 6,954,763 B2 * | 10/2005 | Nunome et al. | ............. | 707/102 |
| 7,028,082 B1 * | 4/2006 | Rosenberg et al. | .......... | 709/223 |
| 7,113,113 B2 * | 9/2006 | Kawachi | ...................... | 341/51 |
| 7,167,896 B2 * | 1/2007 | Hasegawa et al. | ........... | 709/203 |
| 7,272,629 B2 * | 9/2007 | Yamaura et al. | ............. | 709/203 |
| 7,424,730 B2 * | 9/2008 | Chou | .......................... | 725/87 |
| 2001/0005448 A1 * | 6/2001 | Okada et al. | ................... | 386/95 |
| 2002/0188399 A1 * | 12/2002 | Odagawa et al. | ............. | 701/202 |

FOREIGN PATENT DOCUMENTS

| | | |
|---|---|---|
| JP | 2001-231027 | 8/2001 |
| JP | 2001-313741 | 11/2001 |

OTHER PUBLICATIONS

Japanese Office Action dated Jul. 3, 2007—Notification of Reasons for Refusal, Patent Application No. 2002-331416 with English translation.

* cited by examiner

*Primary Examiner*—Yasin Barqadle
(74) *Attorney, Agent, or Firm*—Brinks Hofer Gilson & Lione

(57) ABSTRACT

A hardware constitution and method for playing back different types of media content is provided. Data is registered from a desired medium to a user data storing unit of a server from a PC. Content may then be selected by a vehicle onboard apparatus from the server. The data corresponding to the selected content is then transmitted to the vehicle onboard apparatus, and the data is decoded on the vehicle onboard apparatus using a decoder that corresponds to the content medium.

14 Claims, 8 Drawing Sheets

EXAMPLE OF FUNCTIONAL CONSTITUTION OF MULTIMEDIA
REPRODUCING SYSTEM ACCORDING TO PRESENT EMBODIMENT

EXAMPLE OF GENERATED OPERATION SCREEN

EXAMPLE OF FUNCTIONAL CONSTITUTION FOR LAST POSITION REPRODUCTION

ANOTHER EXAMPLE OF FUNCTIONAL CONSTITUTION OF MULTIMEDIA REPRODUCING SYSTEM ACCORDING TO PRESENT EMBODIMENT

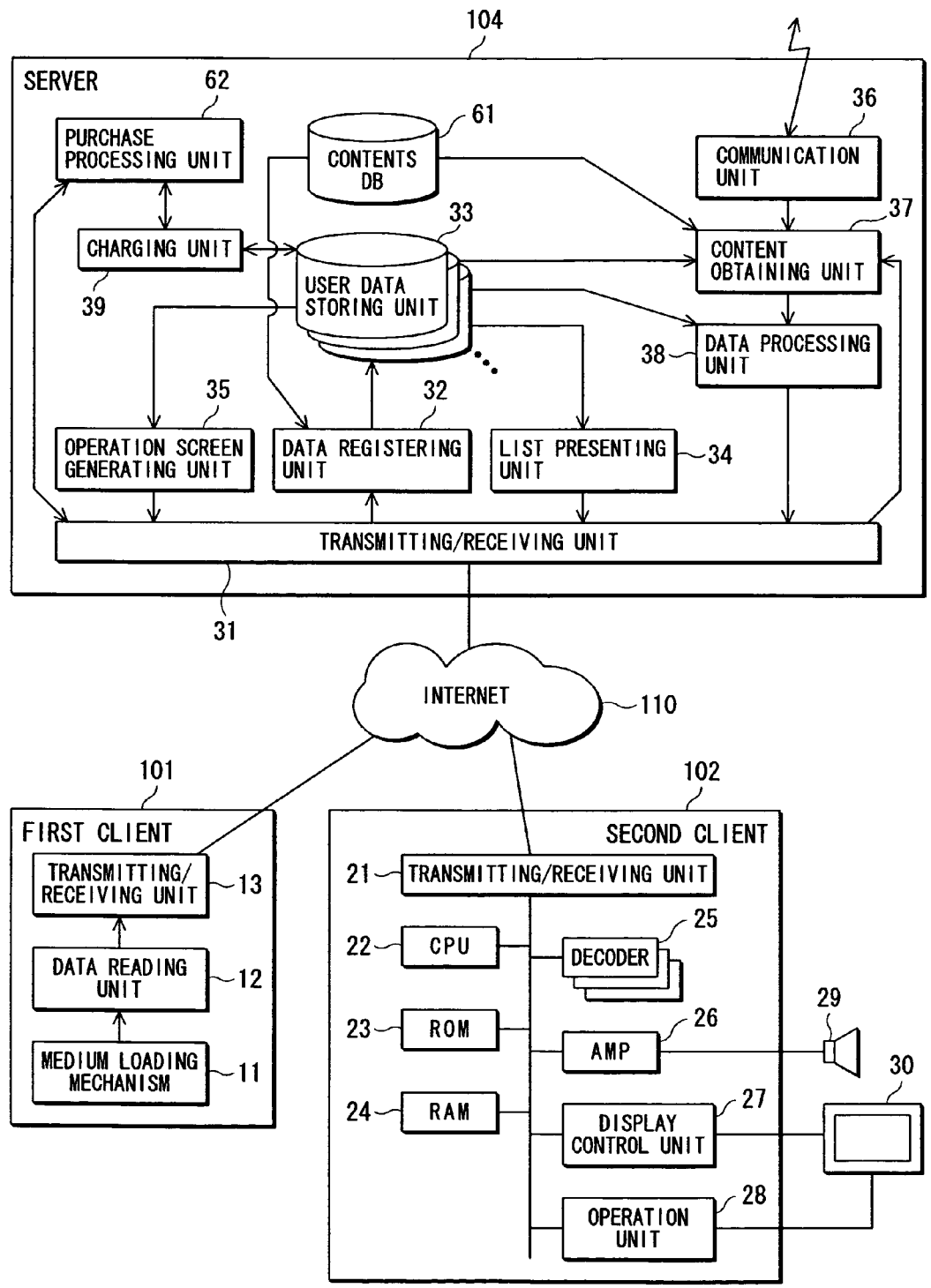

METHOD AND APPARATUS FOR MULTIMEDIA REPRODUCTION

BACKGROUND OF THE INVENTION

1. Field of the Invention

The present invention relates to a multimedia reproducing system client apparatus, a server apparatus, a multimedia reproducing method, and a multimedia reproducing program, and is especially preferable for application to a system that uses a single reproducing apparatus to reproduce data from multimedia such as a CD (Compact Disc), a DVD (Digital Video Disc), a MD (Mini Disc), a cassette tape, and a radio.

2. Description of the Prior Art

Most reproducing apparatuses such as home audio apparatuses and automobile onboard audio apparatuses include a reproducing unit for different types of sources such as a CD player, a DVD player, an MD player, a cassette deck, and a radio tuner. This type of the reproducing apparatus is designed for a user to switch to a desired reproducing unit to enjoy listening to music or viewing video.

Recently, reproducing apparatuses equipped with a hard disk have been supplied. With this type of apparatuses, it is possible to connect to a communication apparatus such as a cellular phone, to download music data or video data from an external server, and to record the data on a hard disk for reproduction.

In addition, in consideration of the fact that it takes a long time to complete the download when the quantity of data is large, it is possible to carry out streaming reproduction where the reproducing apparatus sequentially carries out the reproduction while receiving the data. Usually, this type of download and streaming reproduction of music and movie is managed by specific service providers, who charge data delivery.

This type of reproducing apparatuses includes apparatuses where a user conducts different types of operations through a touch panel screen. On the other hand, there is technology where general-purpose software parts are used for image design of a GUI (Graphical User Interface) operation screen (see, e.g., Japanese Unexamined Patent Application Publication No. 2000-99317).

Providing hardware for each different type of source such as a CD player, a DVD player, an MD player, a cassette deck, and a radio tuner on the conventional reproducing apparatus increases costs. Additionally, a medium must be brought to a listing/viewing site each time reproduction of content is desired. For example, to listen to a CD indoors using a home audio apparatus, or to listen to a CD in car cabin using a car audio apparatus, it is necessary to bring the CD to the respective listening sites (locations where the reproducing machine exists), and thus, the procedure is very cumbersome. Further, the operation is complicated because it is necessary to switch sources each time one wishes to listen to and view different desired music and video content.

Additionally, when a media based on a new standard emerges, there is such a problem that the new media cannot be handled. For example, a CD based on the new standard, SACD (Super Audio CD), cannot be reproduced on a standard CD playback apparatus. Thus, to playback an SACD, it is necessary to newly purchase apparatuses compliant with the SACD at all desired listening/viewing sites such as a home audio apparatus and a car audio apparatus.

In addition, when music data or video data is reproduced using the download reproduction or the streaming reproduction, a charge occurs every time when the data is delivered to the reproducing apparatus. Therefore, even after data is downloaded to a personal computer (PC) once at home, if the same data is downloaded on a car audio apparatus, the charge occurs again, for example. Thus, there is such a problem that a user cannot freely listen to or view desired data at any time.

When data downloaded on a PC is once copied to a semiconductor memory such as a memory card, and is transferred from the semiconductor memory to a hard disk in a car audio apparatus, the charge occurs only once for the first download. However, a copy protect function may be added to a data to be downloaded, and if this is the case, since the data cannot be copied, and thus, the data cannot be transferred from the PC to the car audio apparatus at all.

Even if data is not copy-protected, due to the capacity limit of a semiconductor memory, data with a large quantity or a large number of data cannot be transferred. In addition, even if data is transferred, the operation is cumbersome because it is necessary to repeat copy operation many times for transferring from a PC to a semiconductor memory, and then transferring from the semiconductor memory to a hard disk of an onboard machine.

SUMMARY OF THE PRESENTLY PREFERRED EMBODIMENTS

The presently preferred embodiments are devised to solve these problems, and have a purpose of simplifying the hardware constitution for reproducing data from different types of media, thereby reducing the cost thereof.

In addition, another purpose of the presently preferred embodiments is to enable listening to or viewing desired music or video without a cumbersome operation such as bringing a medium to a site for listening or viewing each time or switching the sources each time.

Additionally, still another purpose of the presently preferred embodiments is to enable listening to or viewing music or video on a new standard medium from any location without purchasing machines compliant with the new standard at all listening and viewing sites.

Further, yet another purpose of the presently preferred embodiments is to enable listening to or viewing desired music or video from any location without redundant charge on the same music or video.

To solve the problems described above, in the presently preferred embodiments, data from desired medium is registered on a user record area on a server apparatus from a first client apparatus, data of a content selected by a second client apparatus is transmitted from the server apparatus to a second client apparatus according to a request provided for the server apparatus from the second client apparatus, and the data is reproduced by applying decoding corresponding to a medium on the second client apparatus.

With the presently preferred embodiments constituted in this manner, the second client apparatus, which reproduces data, only has to include the minimum hardware constitution such as a decoder for decoding data from different types of media, and a CPU, a ROM, and a RAM required for operating the decoder, and does not have to include individual hardware for different types of sources such as a CD player, a DVD player, an MD player, a cassette deck, a radio tuner, etc.

In addition, with the presently preferred embodiments, it is not necessary to bring the medium to a listening/viewing site each time because a desired content on a medium registered in advance in the user record area on the server apparatus is freely received and reproduced on the second client apparatus present at any location. Further, when data is reproduced on the second client apparatus, it is not necessary to switch sources because it is only necessary to select a desired content and notify the selection to the server.

Additionally, with the presently preferred embodiments, because the decoding corresponding to a medium is applied on the second client apparatus, when a medium compliant with a new standard emerges, the media data compliant with the new standard can be reproduced by changing or adding a decoder or a program operating a decoder. It is not necessary to purchase a new second client apparatus.

Also with the presently preferred embodiments, once the desired data is uploaded in the user record area on the server apparatus, it is possible to receive and to listen to/view the uploaded data from the second client apparatus freely at any time, and charge does not occur every time when the same data is received.

BRIEF DESCRIPTION OF THE DRAWINGS

FIG. 8 is a block diagram showing still another functional constitution example of the multimedia reproducing system according to the present embodiment.

DETAILED DESCRIPTION OF THE PREFERRED EMBODIMENTS

The following section provides description based on a first embodiment of the present invention.

Figure 1:
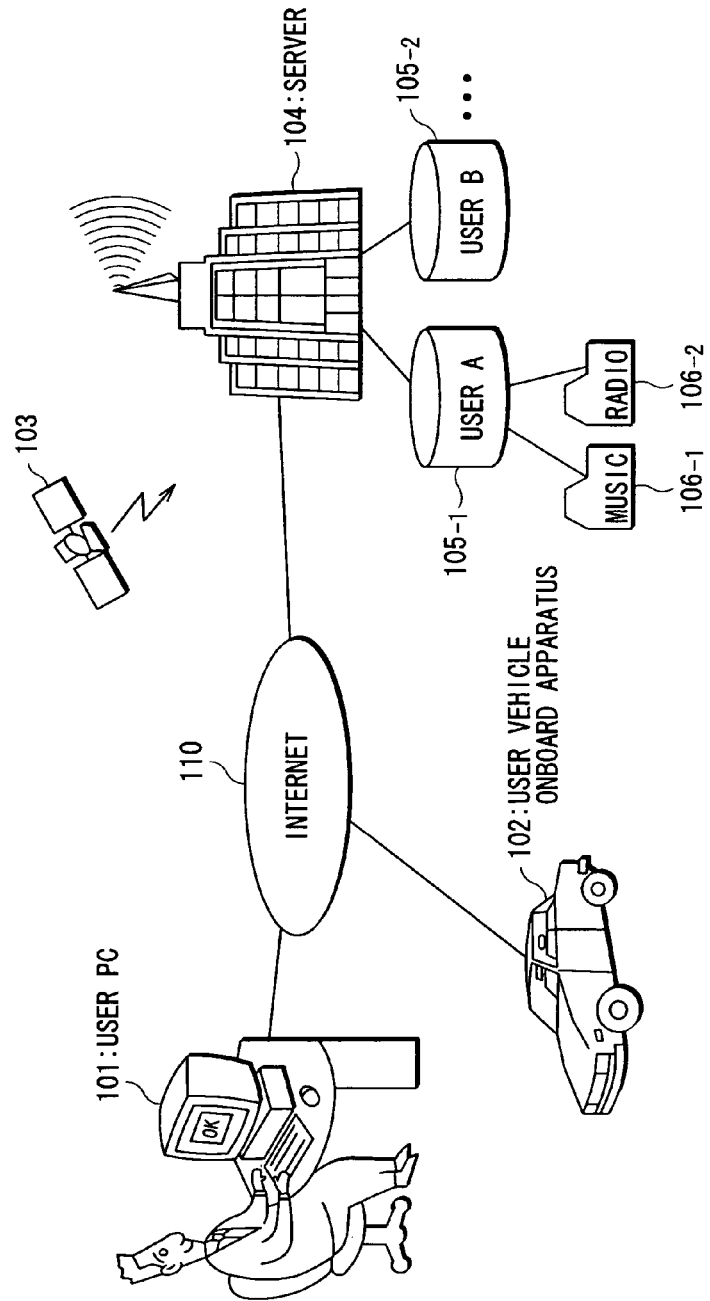
FIG. 1 is a drawing showing an overall constitution of a multimedia reproducing system according to a present embodiment.

FIG. 1 is a drawing showing an overall constitution of a multimedia reproducing system.

As shown in FIG. 1, the multimedia reproducing system according to the present embodiment is comprised of a PC 101 used by a user, a vehicle onboard apparatus (a multimedia receiver) 102, and a server 104 such as a service provider, and is constituted such that they can be connected with each other through a network such as the Internet 110 wiredly or wirelessly.

The server 104 has capability of receiving radio broadcast and TV broadcast all over the world through a satellite 103 or the Internet 110. In addition, the server 104 is comprised of record areas 105-1, 105-2, . . . prepared for the individual users, and folders 106-1, 106-2, . . . are formed in the individual user record areas for music, video, radio, and the like.

In FIG. 1, the PC 101 corresponds to a first client apparatus, and the vehicle onboard apparatus 102 corresponds to a second client apparatus. The server 104 corresponds to a server apparatus.

Figure 2:
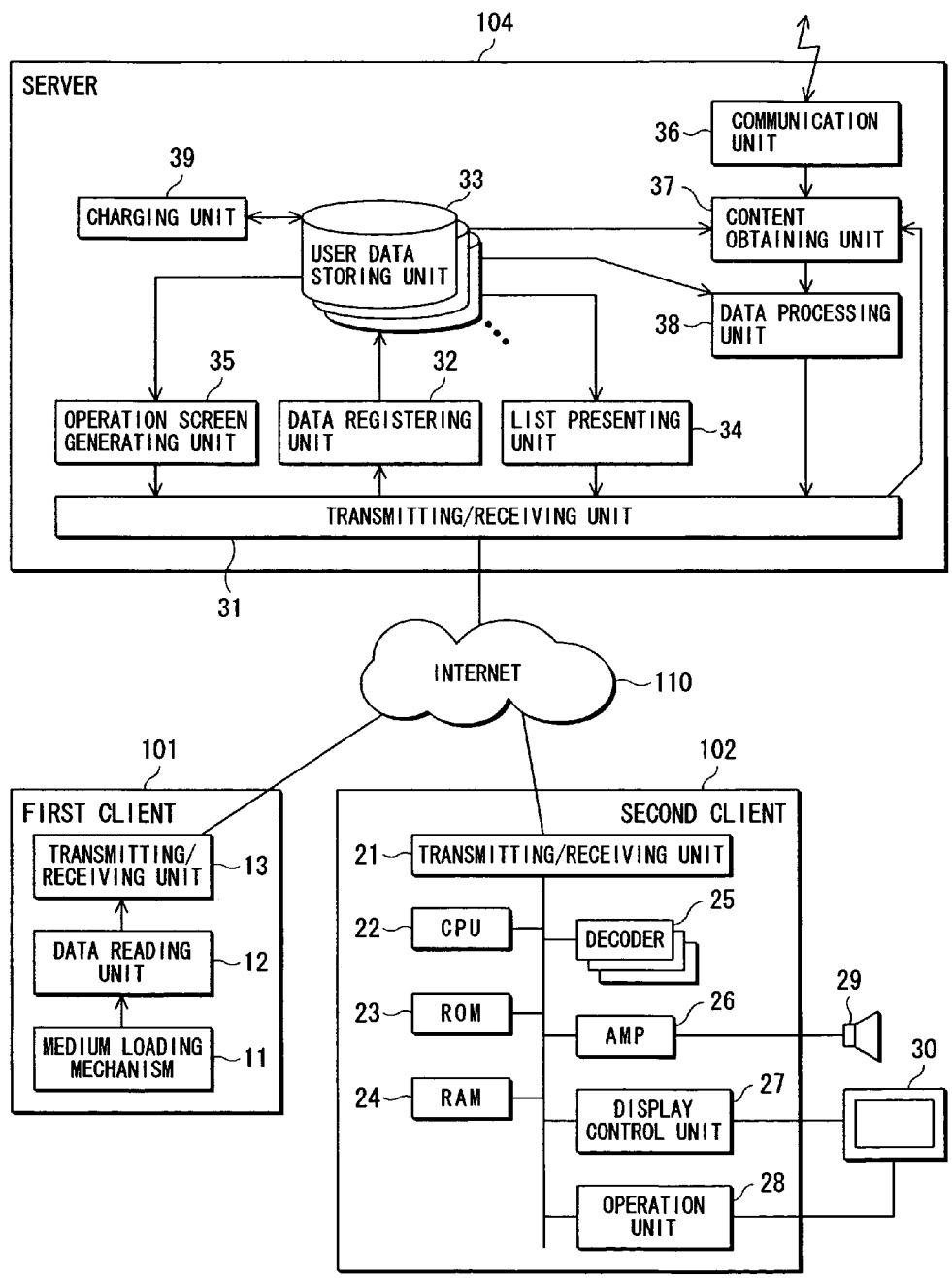
FIG. 2 is a block diagram showing functional constitutions of a first client apparatus, a second client apparatus, and a server apparatus according to the present embodiment.

FIG. 2 is a block diagram showing functional constitutions of the first client apparatus, the second client apparatus, and the server apparatus.

As shown in FIG. 2, the PC 101 serving as the first client apparatus includes a medium loading mechanism 11, a data reading unit 12, and a transmitting/receiving unit 13. The medium loading mechanism 11 is a CD drive or a DVD drive for loading a medium such as a CD, an SACD, or a DVD. When a medium compliant with a new standard is reproduced, at least the PC 101 must comply with the new standard.

Though the PC 101 is used as the first client apparatus in this constitution, a home music apparatus comprised of a CD player, a DVD player, an MD player, a cassette deck, a radio tuner, and the like may be used in place of the PC 101, and a communication apparatus such as a cellular phone may be connected with the apparatus to access to the Internet 110.

The data reading unit 12 reads data on a medium (such as music data on a CD and an MD, and video data on a DVD) loaded on the medium loading mechanism 11. The transmitting/receiving unit 13 transmits/receives data to/from the server 104. In the present embodiment, data read by the data reading unit 12 and data stored on an unillustrated hard disk are transmitted to the server 104. The data reading unit 12 and the transmitting/receiving unit 13 constitute an uploading unit.

The data uploaded to the server 104 includes music data, sources of which may include, for example, a CD, an SACD, an MD, a cassette tape, or an MP3 (MPEG Audio Layer 3) file, and video data, sources of which may include, for example, a DVD, a video tape, or MPEG file.

The automobile onboard apparatus 102 serving as the second client apparatus includes a transmitting/receiving unit 21, a CPU 22, a ROM 23, a RAM 24, multiple decoders 25, an amplifier 26, a display control unit 27, an operation unit 28, a speaker 29, and a monitor 30.

The transmitting/receiving unit 21 transmits and receives data to and from the server 104. The data transmitted to the server 104 include personal information on a user (such as a name, an address, a telephone number, and a credit card number for charging) entered via an input screen shown on the monitor, client information relating to the vehicle onboard apparatus 102 (such as a serial number of an apparatus compliant with the present service and vehicle type information), setting information on music quality and video quality of data to be reproduced, and selection information on functions used on the vehicle onboard apparatus 102. The data received by the transmitting/receiving unit 21 from the server 104 includes a list of contents selectable on the vehicle onboard apparatus 102, data of an operation screen, and data for a content selected from the list.

The CPU 22 controls the entire vehicle onboard apparatus 102. The ROM 23 stores different types of programs. In this way, the ROM 23 constitutes a program storing unit. The RAM 24 temporarily stores data obtained in the course of different types of processes, and data obtained as a result of the different types of processes. The CPU 22 described above applies different processes required for receiving and reproducing a content which a user requests while using the RAM 24 as a work memory according to the different types of programs stored in the ROM 23.

Multiple types of the decoders 25 are prepared corresponding to multiple types of media such as a CD, an SACD, a DVD, an MD, the radio, and the television. Any one of these multiple decoders 25 selectively comes into operation according to the medium of the data received from the server 104, and outputs the data after decoding. When the decoded data is audio data, the amplifier 26 converts the audio data into an analog audio signal, then, amplifies the data by a predetermined amount, and outputs from the speaker 29.

When the data decoded by the decoder 25 is video data, the display control unit 27 provides such control that the video data is shown on the monitor 30. The display control unit 27 also provides such control that an operation screen is shown on the monitor 30 based on the data of the operation screen generated on the server 104 according to the function selection information transmitted from the transmitting/receiving unit 21 to the server 104, and received by the transmitting/receiving unit 21.

The transmitting/receiving unit 21, the CPU 22, the ROM 23, the RAM 24, the decoders 25, the amplifier 26, and the display control unit 27 constitute a reproducing unit. In addition, the transmitting/receiving unit 21 and the display control unit 27 constitute an operation screen display unit.

Note that while description is given of the example where the multiple types of decoders 25 are provided corresponding to the different types of media, it is possible to provide a single decoder for decoding according to a decoding program in the ROM 23, simultaneously to store multiple decoding programs corresponding to multiple types of media in the ROM 23, and to selectively apply a decoding program corresponding to the medium to the single decoder for the decoding. In this case, because only a single decoder is necessary, it is possible to simplify the hardware constitution. In addition, it is possible to easily comply with a medium based on a new standard just by changing or adding a program.

The operation unit 28 may be comprised of a remote controller, a touch panel display on the monitor 30, or similar controller device. The user uses the operation unit 28 to enter the personal information on the user, and the client information described above. The operation unit 28 is used to select the presence/absence or an operation mode of at least one of a reproducing function for different types of data, a setting function for audio quality or video quality, and an equalizer function in the vehicle onboard apparatus 102.

As for the reproducing function for the different types of data, a reproducing function for any source is selected from the reproducing functions for a CD, an SACD, a DVD, an MD, a radio, a television, etc. It is possible to select a single source or a combination of multiple sources. As for the setting function for the audio quality, the selection is made between a simple mode for setting the audio quality adapted to the vehicle type only requiring an entry of vehicle information, and a manual mode for allowing the user to arbitrarily set different items. As for the equalizer function, a selection can be made between using this function and not using the function. In addition, it is possible to select whether interpolated reproduction is conducted for compressed data as an additional function.

When the manual mode is selected for the audio quality setting or the video quality setting, it is possible to set different types of setting (such as adding a reverberation effect, and a surround effect, and acoustic field setting by specifying the distance from the speaker 29) regarding the reproduction quality of the data. When a selection is made to use the equalizer function, it is possible to set desired equalizing information.

The personal information on the user, the client information, the function selection information, the reproduction quality setting information, and the equalizing information entered through the operation unit 28 is transmitted to the server 104 through the transmitting/receiving unit 21 as described above. The operation unit 28 and the transmitting/receiving unit 21 constitute a function selecting unit and a reproduction quality setting function. Note that while description is given of the constitution where the vehicle onboard apparatus 102 includes the function selecting unit and the reproduction quality setting function, the PC 101 may include them.

When the function selection information is transmitted to the server 104, the server 104 generates the operation screen on which only parts required for carrying out the functions are implemented based on the function selection information. The data of the operation screen is received by the transmitting/receiving unit 21 as described above, and is shown as a touch panel screen on the monitor 30. The list of selectable contents is also shown on this touch panel operation screen. The operation unit 28 described above is also used for selecting a desired content from the list shown on the monitor 30. In this way, the operation unit 28 constitutes a selection unit.

Then, the server 104 is constituted by a transmitting/receiving unit 31, a data registering unit 32, a user data storing unit 33, a list presenting unit 34, an operation screen generating unit 35, a communication unit 36, a content obtaining unit 37, a data processing unit 38, and a charging unit 39.

The transmitting/receiving unit 31 transmits/receives data to/from the PC 101 serving as the first client apparatus, and the vehicle onboard apparatus 102 serving as the second client apparatus. For example, the transmitting/receiving unit 31 receives the data uploaded from the PC 101. In addition, the transmitting/receiving unit 31 receives the personal information on the user, the client information, the reproduction quality setting information, and the function selection information transmitted from the vehicle onboard apparatus 102. Further, the transmitting/receiving unit 31 transmits data of the list of the selectable contents, the data of the operation screen, and the data of the selected content to the vehicle onboard apparatus 102.

The data registering unit 32 registers data uploaded from the PC 101 to the user data storing unit 33. The user data storing unit 33 includes recording areas (the user record areas 105-1, 105-2, . . . shown in FIG. 1) which are different from each other for the individual users, and independently stores uploaded data from the individual users to the respective recording areas. This data registering unit 32 also registers the personal information on the user, the client information, the reproduction quality setting information, the function selection information, the equalizing information, and the like transmitted from the vehicle onboard apparatus 102 to the recording areas of the individual users.

The list presenting unit 34 shows a list of contents selectable by the user based on the data registered to the user record area in the user data storing unit 33 on the monitor 30 of the vehicle onboard apparatus 102 through the transmitting/receiving unit 31.

The operation screen generating unit 35 generates the data of the operation screen shown on the monitor 30 for the individual users based on the function selection information transmitted from the vehicle onboard apparatus 102, and then, registered to the user data storing unit 33. This operation screen is a screen allowing an operation required for reproducing different types of sources such as reproducing or stopping music or video, operating a volume, and selecting reception frequency of a radio.

For example, when only a reproducing function for a CD is selected in the function selection information, the operation screen generating unit 35 generates data of an operation screen including only parts required for the reproduction. This operation screen is transmitted from the transmitting/receiving unit 31 to the vehicle onboard apparatus 102 as described above. The operation screen generating unit 35 and the transmitting/receiving unit 31 constitute an operation screen generating unit.

The communication unit 36 receives radio broadcast and television broadcast from all over the world through the satellite 103. Data of the radio broadcast and the television broadcast received by the communication unit 36 may be registered to the user data storing unit 33 through the data registering unit 32. Note that the radio broadcast and the television broadcast may be received by the transmitting/receiving unit 31 through the Internet 110. In this case, the communication unit 36 may be omitted from the constitution of the server 104.

The content obtaining unit 37 obtains the content, which is selected by the vehicle onboard apparatus 102, and then, notified through the transmitting/receiving unit 31, from the user data storing unit 33 or the communication unit 36.

The data processing unit 38 processes data of the content obtained by the content obtaining unit 37 based on the setting information for the reproduction quality and the equalizing information transmitted by the vehicle onboard apparatus 102, and then, registered to the user data storing unit 33. In this way, the data processing unit 38 constitutes the data converting unit. For example, when the reverberation effect and the surround effect are set as the audio quality setting information, these effects are added to the audio data obtained by the content obtaining unit 37. When the equalizing information is set, the music data is processed according to the setting information.

When the content obtaining unit 37 obtains a compressed file in the MP3 format from the user data storing unit 33, the data processing unit 38 decodes the compressed file once, and then applies processing to the decoded data, and again, compresses the data into a file in the MP3 format. The transmitting/receiving unit 31 transmits the data processed by the data processing unit 38 to the vehicle onboard apparatus 102, which is a source of the request. This transmitting/receiving unit 31 constitutes a server data transmitting/receiving unit.

The charging unit 39 carries out the charging process according to the content of the functions selected by the operation unit 28 of the vehicle onboard apparatus 102, and then registered to the user data storing unit 33. For example, the charge is carried out according to for which source the reproducing function is selected, which mode is selected as the reproducing quality, and whether additional functions such as the equalizer function and the interpolated data reproduction function are selected.

The functional constitutions of the PC 101, the vehicle onboard apparatus 102, and the server 104 shown in FIG. 2 are actually constituted by a CPU or an MPU, a RAM, a ROM, and the like of a computer, and are realized by the operation of a program stored in the RAM and the ROM. Therefore, these functional constitutions are realized by recording a program operating the computer so as to attain the functions of the present embodiment on a recording medium such as a CD-ROM, and causing the computer to read the medium.

Recording media which can be used for recording the program include a flexible disk, a hard disk, a magnetic tape, an optical disk, a magneto-optic disc, a DVD, and a non-volatile memory card in addition to a CD-ROM. In addition, these functional constitutions are also realized by downloading the program to a computer through a network such as the Internet 110.

Also, in addition to the case where the computer executes the supplied program to realize the functions of the embodiment described above, the embodiment of the present invention also includes a case where the program in combination with an OS (Operating System) operating on the computer or other application software realizes the functions of the embodiment described above, or a case where a function extension board or a function extension unit carries out a part of or the whole of the process of the supplied program to realize the functions of the embodiment.

Figure 3:
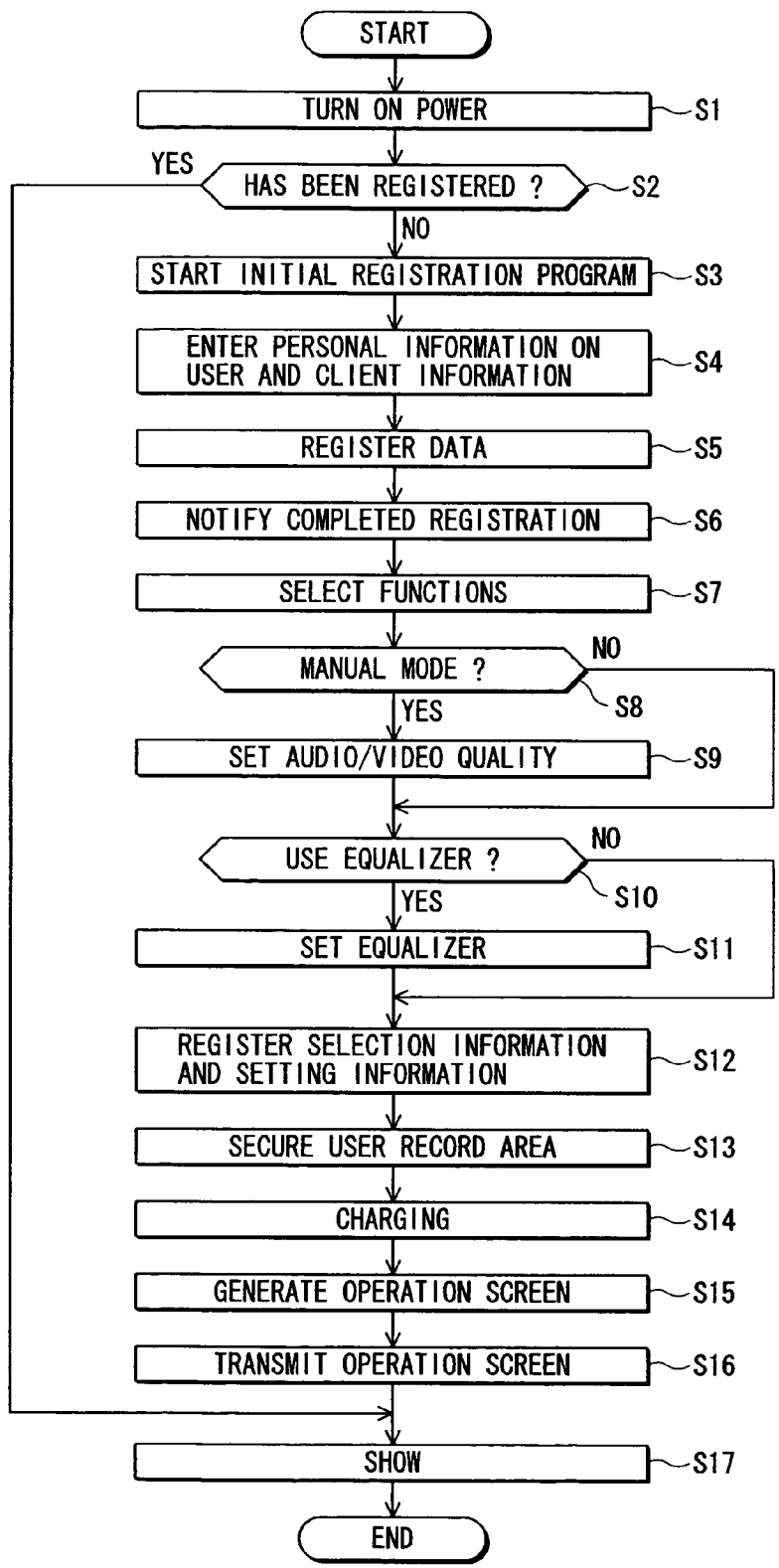
FIG. 3 is a flowchart showing an initial registration operation carried out between a vehicle onboard apparatus and the server according to the present embodiment.

A description will now be given of an operation of the multimedia reproducing system according to the present embodiment constituted as described above. FIG. 3 is a flowchart showing an initial registration operation carried out between the vehicle onboard apparatus 102 and the server 104. In FIG. 3, after a user purchases the vehicle onboard apparatus 102 (a multimedia receiver) from a retailer, and installs it on his/her car, when the user turns on the power (act S1), the CPU 22 of the vehicle onboard apparatus 102 determines whether initial registration has already been carried out (act S2).

If the initial registration has not been completed yet, the CPU 22 starts an initial registration program stored in the ROM 23, and then, shows an input screen in a predetermined format on the monitor 30 (act S3). The user uses the operation unit 28 to enter the personal information on the user, and the client information on the vehicle onboard apparatus 102 on this input screen (act S4).

After this information entry completes, the CPU 22 automatically connects with the server 104 through the Internet 110, and registers the entered information (act S5). When the server 104 stores the personal information on the user and the client information transmitted from the vehicle onboard apparatus 102 in the user data storing unit 33, the server 104 notifies the vehicle onboard apparatus 102 of the completed registration (act S6).

When the information registration completes as described above, the CPU 22 starts the setup of the vehicle onboard apparatus 102. In this setup operation, the CPU 22 shows a predetermined function selection screen on the monitor 30, and prompts the user to select functions. The user uses the operation unit 28 to select functions necessary for the user (act S7).

Then, the CPU 22 determines whether the manual mode is selected as the setting function for the reproduction quality (act S8), shows a predetermined audio quality setting screen, or video quality setting screen on the monitor 30 if the manual mode is selected, and prompts the setting by the user. The user uses the operation unit 28 to set a desired audio quality or video quality (act S9).

Then, the CPU 22 determines whether using the equalizer function is selected (act S10), shows a predetermined equalizing screen on the monitor 30 if the equalizer function is selected, and prompts the setting by the user. The user uses the operation unit 28 to set the equalizer to a desired state (act S11).

After having selected the functions, having set the reproduction quality, and having set the equalizer, the CPU 22 automatically connects to the server 104 through the Internet 110, and registers the selection information and the setting information (act S12). The server 104 secures a recording area dedicated for the user in the user data storing unit 33 according to the function selection information transmitted from the vehicle onboard apparatus 102 (act S13). For example, when only music is reproduced, a recording area of 20 GB (gigabyte) is secured, and when music and video are reproduced, a recording area of 1 TB (terabyte) is secured. At this time, folders for music, video, radio, and the like are created.

Then charging unit 39 carries out charging for each of the actually selected functions and services based on the function selection information described above (act S14). Note that sets of functions may be provided in advance, and charging may be carried out based on the sets. Also, the operation screen generating unit 35 generates data of an operation screen on which only parts required for carrying out the selected functions are implemented based on the function selection information described above (act S15), and transmits the data to the vehicle onboard apparatus 102 through the transmitting/receiving unit 31 (act S16).

On the vehicle onboard apparatus 102, the data of the operation screen transmitted from the server 104 is received by the transmitting/receiving unit 21, and is shown as a touch panel screen on the monitor 30 through the display control unit 27 (act S17). As a result, the operation screen which can carry out only the functions selected by the user is shown on the monitor 30 in response to receiving the operation screen data as shown in FIG. 4.

Figure 4:
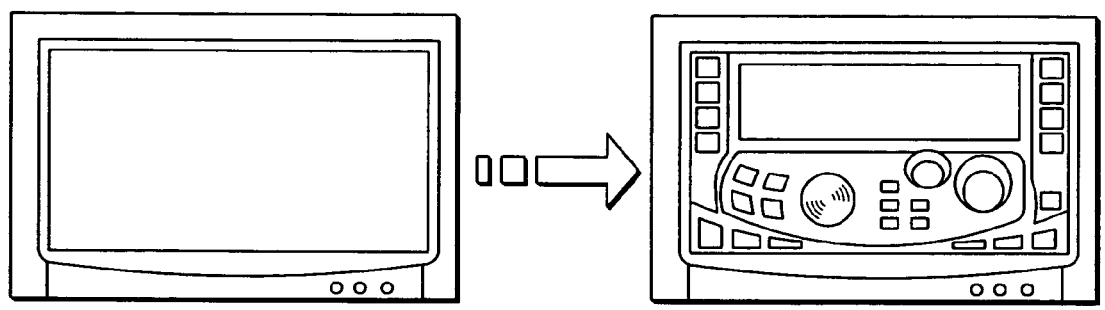
FIG. 4 shows an example of an operation screen generated by an operation screen generating unit according to the present embodiment.

In an example of the operation screen shown in FIG. 4 are arranged different types of operators such as a play button, a stop button, a skip button, and a volume button for music, a tuning button and a preset button for the radio, and an initializing button as well as a display frame for showing different types of information (such as a selected source, a track number being reproduced, a volume, and a receiving frequency).

The initial registration operation completes after the procedure described above. Note that if it is determined that the initial registration has already been completed in act S2, the procedure jumps to act S17, and shows the operation screen on the monitor 30 based on screen data already generated in previous initial registration, and stored in the vehicle onboard apparatus 102.

Note that while the setting for the audio quality and the video quality and the setting for the equalizer are carried out in act S9 and act S11 during the initial registration operation, these settings may be carried out at a subsequent arbitrary moment. For example, a setting button may be provided at a portion of the operation screen shown on the monitor 30, a predetermined setting screen may be reached by operating the button at an arbitrary moment, and the setting may be changed on this screen. When the setting is changed, information after the change is transmitted to the server 104, and is stored as update in the user data storing unit 33.

In addition, when desired content is selected on the vehicle onboard apparatus 102, and a request for transmitting the content is made to the server 104, the audio quality, and the video quality and the equalizer may be set if necessary. For example, when the user selects a desired content on the operation screen on the monitor 30, a screen for setting the reproducing quality or a screen for setting the equalizer may appear. Then, the settings may be changed if the user requests.

Figure 5:
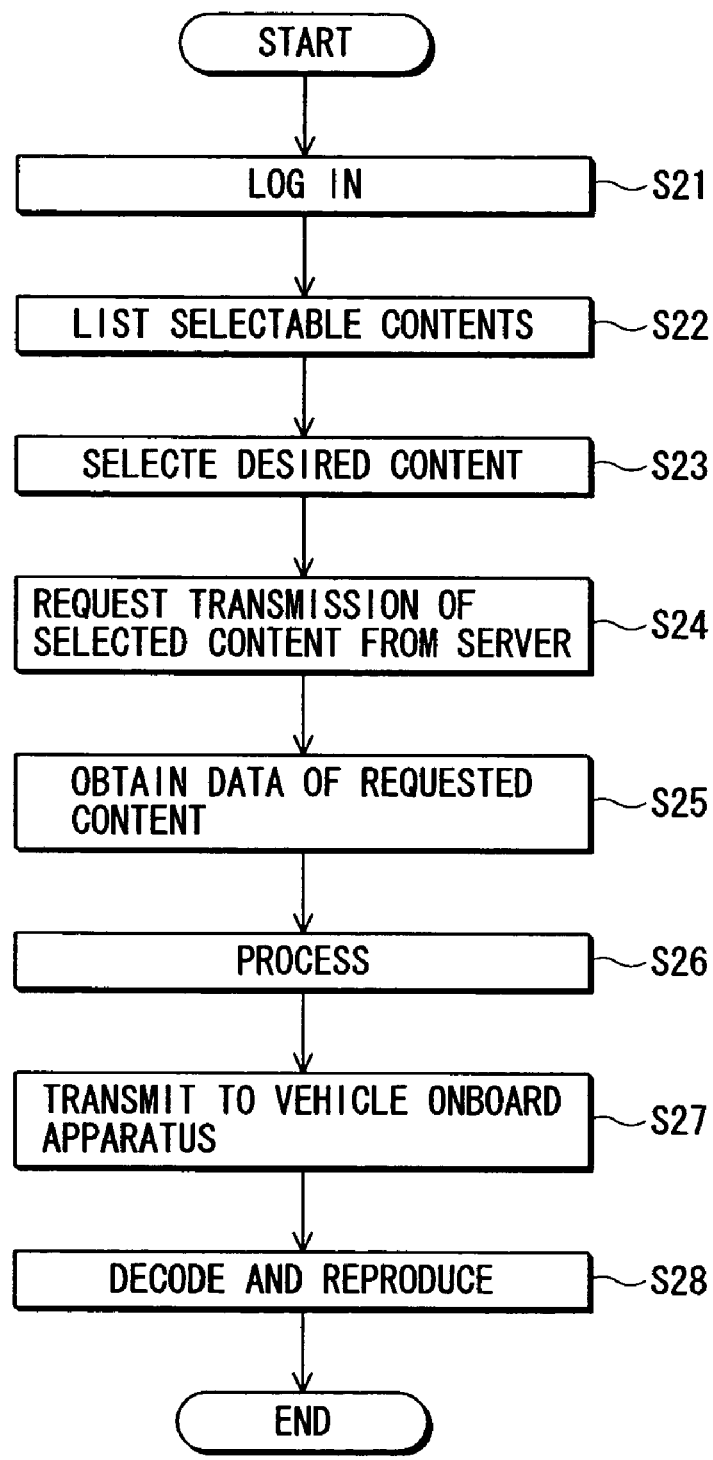
FIG. 5 is a flowchart showing a content delivery operation carried out between the vehicle onboard apparatus and the server according to the present embodiment.

FIG. 5 is a flowchart showing a content delivery operation carried out between the vehicle onboard apparatus 102 and the server 104. In FIG. 5, when a user logs in the server 104 from the vehicle onboard apparatus 102 (act S21), the server 104 presents a list of contents available for selection by the user on the monitor 30 of the vehicle onboard apparatus 102 based on the data already uploaded and registered to the user information storing unit 33 (act S22).

In response, the user uses the operation unit 28 to select a desired content from a list presented on the monitor 30 (act S23). When the desired content is selected, the transmitting/receiving unit 21 of the vehicle onboard apparatus 102 requests the server 104 to transmit the selected content (act S24).

The content obtaining unit 37 of the server 104 obtains data of the requested content from the user data storing unit 33 or the communication unit 36 according to the request (act S25). Then, the obtained data is processed based on the reproduction quality setting information and the equalizing information registered to the user data storing unit 33 (act S26), and is transmitted to the vehicle onboard apparatus 102 (act S27).

The vehicle onboard apparatus 102 receives the data transmitted from the server 104 with the transmitting/receiving unit 21, decodes the data with the decoder 25 corresponding to the medium of the data, and reproduces the data (act S28).

At this time, when data of the radio or the television is reproduced, it is possible to listen to or view radio broadcast or television broadcast all over the world because the data can be received through the server 104. In addition, it is also possible to listen to the Internet radio.

When music data such as a CD, an SACD, and an MD is reproduced, it is determined from which tune the reproduction begins in an initial setting. In general, the tunes are sequentially reproduced from the first tune of an album. It is also possible to store a position which is being listened to immediately before the reproduction stops last time (referred to as a last position hereinafter) in a memory, and to start the reproduction of the music from the last position when reproduction is instructed again.

Figure 6A:
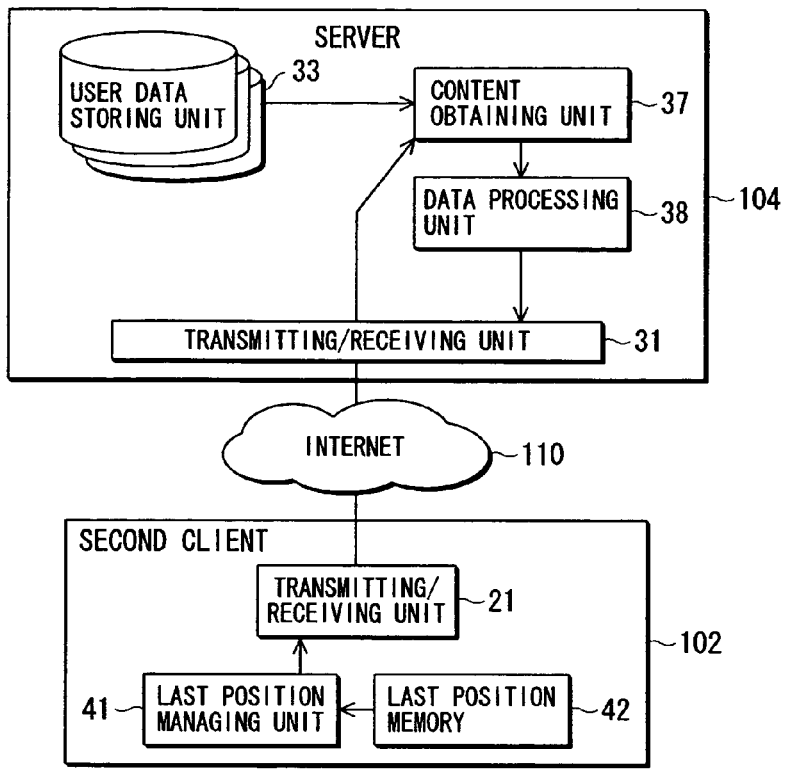
FIG. 6 is a drawing showing a functional constitution example required for last position reproduction of music data according to the present embodiment.
Figure 6B:
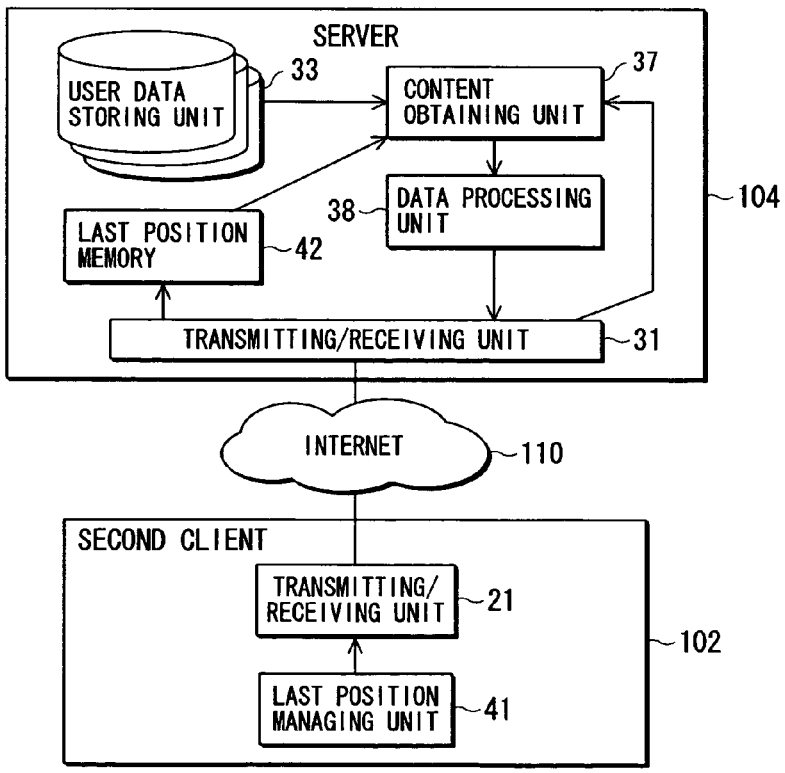

FIG. 6 is a drawing showing a functional constitution required for last position reproduction of music data. FIG. 6(*a*) shows an example where a last position memory is provided on the vehicle onboard apparatus 102, and FIG. 6(*b*) shows an example where the last position memory is provided on the server 104. Note that in FIG. 6(*a*) and FIG. 6(*b*), the same numerals are assigned to constitution elements providing the same functionality as those shown in FIG. 2.

As FIG. 6(*a*) shows, the vehicle onboard apparatus 102 includes a last position managing unit 41 and a last position memory 42. In this way, the last position memory 42 constitutes a last position storing unit according to the present invention. The last position managing unit 41 manages the position of data being reproduced, and stores last position information indicating the last reproduced position in the last position memory 42. The last position memory 42 is a nonvolatile memory, and maintains the stored last position information even if the power to the vehicle onboard apparatus 102 is turned off.

The last position information includes identification information for identifying a medium being reproduced or a tune which is a content of the medium and information such as a reproduction time from the start of the tune. The last position managing unit 41 records the last position information in the last position memory 42 with an interval of a few seconds, for example. Alternatively, the last position information may be recorded only when the reproduction is stopped in the vehicle onboard apparatus 102. Yet alternatively, the last position information may be recorded each time when the reproduction is switched to a new tune (in this case the reproduction time of a tune is not recorded). The present embodiment does not specifically restrict the timing for recording the last position.

The transmitting/receiving unit 21 of the vehicle onboard apparatus 102 transmits the last position information stored in the last position memory 42 to the server 104. The timing for transmitting the last position information is the timing of act S24 in FIG. 5, for example. Namely, when the transmission of the content selected by the user is requested to the server 104, the last position information corresponding to the content is also transmitted to the server 104 if the last position information is stored in the last position memory 42.

When the data transmission request is received from the vehicle onboard apparatus 102, the content obtaining unit 37 of the server 104 obtains the requested data from the user data storing unit 33. At this moment, the content obtaining unit 35 obtains data starting from the last position based on the last position information provided from the vehicle onboard apparatus 102 (act S25 in FIG. 5). The subsequent operation is the same as the operation described above.

Note that while the server 104 obtains the data of the content requested from the user of the vehicle onboard apparatus 102 starting from the last position, and transmits the data to the vehicle onboard apparatus 102 for reproduction, the constitution is not limited to this example. For example, the entire data requested by the user of the vehicle onboard apparatus 102 may be transmitted from the server 104 to the vehicle onboard apparatus 102, the decoder 25 of the vehicle onboard apparatus 102 may determine the last position, and the reproduction may start from the last position. In this case, it is not necessary to transmit the last position information to the server 104.

On the other hand, in the constitution example shown in FIG. 6(*b*), the vehicle onboard apparatus 102 includes the last position managing unit 41, and simultaneously, the server 104 includes the last position memory 42. In this case, the last position managing unit 41 transmits the last position information to the server 104 through the transmitting/receiving unit 21, thereby recording the last position information to the last position memory 42 of the server 104.

In this example, the last position information may be sequentially transmitted from the vehicle onboard apparatus 102 to the server 104, and then, be recorded, or may be transmitted to the server 104, and then, be recorded only when the vehicle onboard apparatus 102 stops reproduction. Alternatively, the last position information may be transmitted to the server 104, and then, be recorded each time when the reproduction moves to a new tune. The timing of transmitting and recording the last position information is not specifically restricted.

When the content obtaining unit 37 of the server 104 receives the data transmission request from the vehicle onboard apparatus 102 in act S24 in FIG. 5 described above, the content obtaining unit 37 reads out the last position information from the last position memory 42, and obtains the data of the requested content starting from the last position (act S25 in FIG. 5). The other operation is the same as the operation described above.

Since the last position managing unit 41 is installed on the vehicle onboard apparatus 102 both in the examples in FIG. 6(*a*) and FIG. 6(*b*), the last position managing unit 41 can adapt to the case where data is reproduced after the data is downloaded from the server 104 to the vehicle onboard apparatus 102 as well as a case where the data is reproduced as stream. In case of the stream reproduction, when the server 104 includes both the last position managing unit 41 and the last position memory 42, the last position may be managed only on the server 104.

As detailed above, desired data on a medium is registered from the PC 101 to the server 104, and a content selected by the vehicle onboard apparatus 102 is transmitted from the server 104 to the vehicle onboard apparatus 102 for reproduction in the present embodiment. Consequently, it is not necessary to bring the medium to a listening/viewing location each time because the desired data registered to the server 104 in advance is freely received and reproduced on the vehicle onboard apparatus 102 at any time and location. Further, when data is reproduced on the vehicle onboard apparatus 102, it is not necessary to operate to switch sources each time either because it is only necessary to select a desired content, and to notify the selection to the server 104.

Also, with the present embodiment, the vehicle onboard apparatus 102, which reproduces data, has to include only the minimum hardware constitution such as the decoder 25, the CPU 22, the ROM 23, and the RAM 24, and it is not necessary to include individual hardware constitutions for different types of sources such as a CD player, a DVD player, an MD player, a cassette deck and a radio tuner. Consequently, it is possible to simplify the hardware constitution, thereby reducing the cost.

In addition, with the present embodiment, when desired data has been uploaded from the PC 101 to the user record area on the server 104, the vehicle onboard apparatus 102 can freely receive and listen to/view the data at any time, and charge does not occur to the same content each time when the data is received. In addition, the charge is carried out according to the contents of the functions selected by the user, the user can use the service at a low rate by selecting only the minimum necessary functions.

Additionally, with the present embodiment, since decoding corresponding to a medium is applied for the reproduction on the vehicle onboard apparatus 102, when a medium compliant with a new standard emerges, the media data compliant with the new standard can be reproduced only by changing or adding the decoder 25 or a program operating the decoder 25. Thus, when a medium compliant with a new standard emerges, it is not necessary to purchase the vehicle onboard apparatus 102 compliant with the new standard.

Also, with the present embodiment, a user can arbitrarily select different types of functions on the vehicle onboard apparatus 102, and the server 104 generates an operation screen corresponding to the selection, and shows the screen on the monitor 30 of the vehicle onboard apparatus 102. As a result, the operation screen changes according to the functions selected by the user based on the user's preference, and it is possible to show only the minimum necessary information on the screen. Consequently, since it is possible to eliminate unnecessary parts from the screen for the individual users, the screen becomes neat and easy to operate.

In addition, with the present embodiment, a user arbitrarily sets the reproduction quality of the data and the equalizer function on the vehicle onboard apparatus 102, and the server 104 processes the data based on the setting, and then, transmits the data. As a result, it is possible to receive and reproduce data with audio or video quality requested by the user from the server 104 without providing a function for processing the data on the vehicle onboard apparatus 102. Therefore, it is possible to further simplify the hardware constitution of the vehicle onboard apparatus 102.

In the embodiment described above, data from the different types of media (such as a CD, a DVD, an MD, and an MP3) registered to the server 104 from the PC 101 is directly transmitted to the vehicle onboard apparatus 102, and is properly decoded by multiple decoders 25 (or multiple decoding programs) provided for different types of the media for reproduction on the vehicle onboard apparatus 102. Alternatively, data from a medium selected by a user may be properly converted into data in a predetermined format on the server 104, and the data after the conversion may be transmitted to the vehicle onboard apparatus 102.

Figure 7:
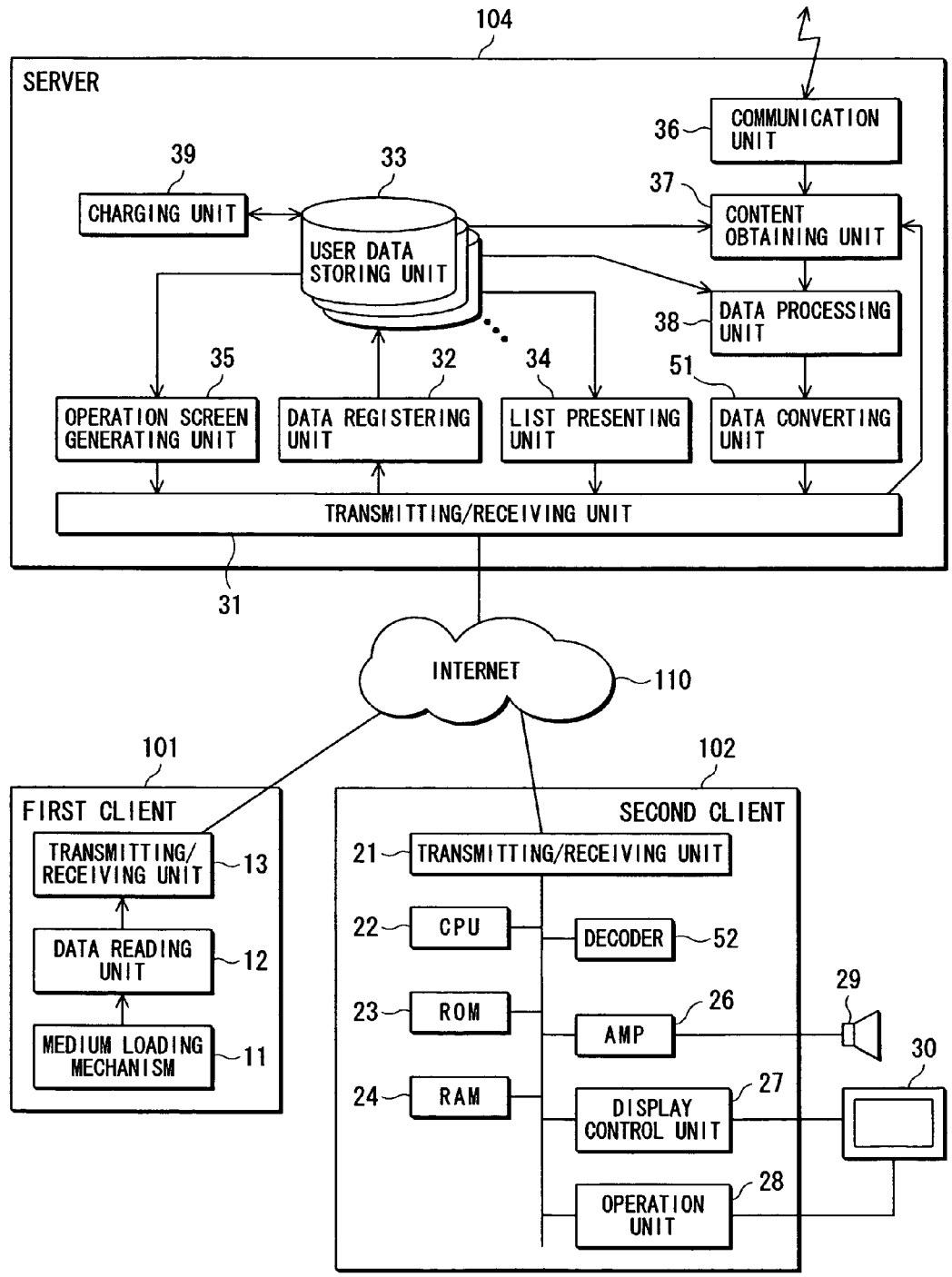
FIG. 7 is a block diagram showing another functional constitution example of the multimedia reproducing system according to the present embodiment.

FIG. 7 is a block diagram showing a functional constitution example of the multimedia reproducing system in this case. Note that in FIG. 7, since the same numerals are assigned to constitution elements providing the same functionality as those shown in FIG. 2, redundant description is not given.

In FIG. 7, the server 104 includes a data converting unit 51. This data converting unit 51 converts the data processed by the data processing unit 38 into a compressed file in the MP3 format in case of audio or the MPEG4 format in case of video, for example. The transmitting/receiving unit 31 transmits the data generated by the data converting unit 51 to the vehicle onboard apparatus 102.

The vehicle onboard apparatus 102 includes the decoder 52 only compliant with MP3 and MPEG4. The decoder 52 applies decoding corresponding to MP3 or MPEG4 to data of a content transmitted from the server 104, thereby reproducing the data.

When the embodiment is constituted in this way, the vehicle onboard apparatus 102 does not have to include a decoder or decoding program compliant with multiple media, and thus, the constitution is further simplified. Thus, it is possible to further reduce the cost of the vehicle onboard apparatus 102.

Though the list presenting unit 34 shows the vehicle onboard apparatus 102 a list of contents registered to the user data storing unit 33 in advance in the embodiment described above, contents prepared by the server 104 may be shown to the vehicle onboard apparatus 102 as well. The contents prepared by the server 104 include arbitrary contents such as contents of news release, and contents suited to the preference of a user automatically determined based on the personal information on the user.

FIG. 8 is a block diagram showing a functional constitution of the multimedia reproducing system in this case. Note that in FIG. 8, since the same numerals are assigned to constitution elements providing the same functionality as those shown in FIG. 2, redundant description is not given.

As shown in FIG. 8, the server 104 includes a contents data base (DB) 61 for accumulating different types of contents prepared by the server 104 and a purchase processing unit 62. When the transmitting/receiving unit 31 notifies that a content (a content stored in the contents DB 61) other than the contents registered by the user himself or herself to the user data storing unit 33 is selected, the purchase processing unit 62 carries out purchase processing for the selected content.

The purchase processing implied here is the same processing as the online shopping using the Internet (electronic commerce). Namely, a selected content is put in a virtual shopping cart, and the price and the like are presented on the monitor 30 of the vehicle onboard apparatus 102 so as to ask for approval from the user. Then, after the user approves, the charging unit 39 is used to carry out charge process according to the content (charges 800 yen for CD quality, and charges 300 yen for MP3 format, for example).

When the vehicle onboard apparatus 102 notifies selection of a content stored in the contents DB 61, the data registering unit 32 obtains the selected content from the contents DB 61, and registers it to a corresponding user record area in the user data storing unit 33. Note that while the description is given of the example where the server 104 itself includes the contents DB 61, the contents DB 61 may be provided at a location on the Internet 110 other than the server 104, and the content may be obtained from the contents DB 61 as needed.

As described above, in the example shown in FIG. 8, it is not necessary to carry out such a cumbersome operation that a content purchased by a user is downloaded on the PC 101 once, and then, is uploaded to the server 104. After the user simply selects a desired content on the monitor 30 of the vehicle onboard apparatus 102, the user can automatically register the content to his or her user record area, and can freely listen to or view the content afterwards.

Note that though a description is given of an example where the PC 101 is used as the first client apparatus and the vehicle onboard apparatus 102 is used as the second client apparatus in the embodiment described above, both an electronic apparatus including a communication interface connectable to the server 104 and an electronic apparatus connectable to a relay apparatus including the communication interface may be used as the first and second client apparatuses. For example, mobile devices such as a note PC, a cellular phone, a PDA (Personal Digital Assistants), a digital camera, a video camera, and a game machine may be used as the first and second client apparatuses.

Though a description is given of an example where data from different types of media are registered to the server 104 from the PC 101 in the embodiment described above, an ISRC code of a medium (an identification number for the medium) may be read, and may be registered to the server 104. In this case, the data of the medium are prepared on the server 104 as the contents DB 61 in FIG. 8. Then, according to the request made from the vehicle onboard apparatus 102 to the server 104, a content selected on the vehicle onboard apparatus 102 is retrieved based on the ISRC code, is transmitted to the vehicle onboard apparatus 102, and then, is reproduced.

With this constitution, when a content to be reproduced on the vehicle onboard apparatus 102 is registered from the PC 101 to the server 104, since it is necessary to register not a content itself, but only an ISRC code, it is not necessary to prepare a large quantity of storage space for multiple users as the user data storing unit 33.

A description is given of an example where the user record area in the user data storing unit 33 stores all of data from desired media uploaded from the PC 101 as well as the personal information on a user entered from the vehicle onboard apparatus 102, the client information, the function selection information, the reproduction quality setting information, the equalizing information, and further the charge information processed by the charging unit 39, in the embodiment described above. On the contrary, the storage may be divided into a database for storing the data from different types of media, a user managing database for storing the personal information on a user, the client information, the function selection information, the reproduction quality setting information, and the equalizing information, and a charge database for storing the charge information.

Additionally, though the description is provided of the example where desired data from a medium is uploaded from the PC 101 to the server 104, and the uploaded data is received and reproduced by the vehicle onboard apparatus 102, namely an example where the first client apparatus for uploading and the second client apparatus for reproducing are different from each other in the embodiment described above, the first client apparatus and the second client apparatus may be the same.

In addition, any aspects of the embodiment described above simply show specific examples for embodying the present invention, and the embodiment should not cause the technical scope of the present invention to be restrictively interpreted. Namely, the present invention may be embodied in various forms without departing from the spirit and essential characteristics thereof.

As described above, since the data from the desired medium is registered to the user record area of the server apparatus from the first client apparatus, the server apparatus transmits data of a content selected by the second client apparatus to the second client apparatus, and the second client apparatus applies decoding corresponding to the medium for reproduction, the second client apparatus has to have only the minimum necessary hardware constitution required for the decoder and operating the decoder, and thus, it is possible to simplify the constitution to reduce the cost.

In addition, since a desired content from a medium registered to the server apparatus in advance is freely received and reproduced on the second client apparatus existing at an arbitrary location, it is not necessary to bring the medium to a listening/viewing site each time. Further, when a content is reproduced on the second client apparatus, since it is only necessary to select a desired content, and to notify the selection to the server apparatus, it is not necessary to operate to switch sources each time either. Thus, it is possible to drastically reduce the labor of a user when a desired content is reproduced.

Additionally, since decoding corresponding to a medium is applied on the second client apparatus, when a medium compliant with a new standard emerges, the medium data compliant with the new standard can be reproduced only by changing or adding a decoder or a program operating the decoder. Therefore, it is possible to eliminate the necessity of purchasing a new second client apparatus when a new medium emerges.

Also, when data from a desired medium is registered to the user record area on the server apparatus, charge is not carried out redundantly on the same data, and it is possible to freely listen to or view desired data at any time.

What is claimed is:

1. A multimedia reproducing system comprising:
   a first client apparatus including an uploading unit operable to allow a user to transmit data from a desired medium of the user to a server apparatus, the server apparatus including a data registering unit operable to register data transmitted from the first client apparatus by the uploading unit to a user record area prepared in advance for individual users;
   a list presenting unit operable to present a list of music data on a vehicle onboard apparatus to the user that are available to be transmitted to the vehicle onboard apparatus based on data registered by the data registering unit, wherein the presented music data is music data uploaded in advance onto the server apparatus by the user; and
   a server data transmitting/receiving unit operable to transmit desired music data of the list of music data to the vehicle onboard apparatus of the user in response to a selection by the user at the vehicle onboard apparatus of the desired music data of the list of music data available to be transmitted to the vehicle onboard apparatus;
   wherein the vehicle onboard apparatus comprises a selecting unit operable to select the desired music data from the list presented by the list presenting unit, a reproducing unit operable to receive the data transmitted from the server data transmitting/receiving unit and reproduce the data through decoding that corresponds to a media type, and a function selecting unit operable to select an operation mode relating to a reproduction quality or equalization;
   wherein the list presenting unit is further operable to present on the vehicle onboard apparatus a list of music data available for purchase at the vehicle onboard apparatus and the server data transmitting/receiving unit is further operable to transmit to the vehicle onboard apparatus desired music data of the list of music data available for purchase in response to a selection and purchase by the user at the vehicle onboard apparatus of the desired music data of the list of music data available for purchase, wherein the user is charged for the desired music data of the list of music data available for purchase based on which mode is selected as a reproduction quality and whether an equalizer function or an interpolated data function are selected; and
   wherein the server apparatus includes an operation screen generating unit operable to generate an operation screen presented on the vehicle onboard apparatus based on the content of the function selected by the function selecting unit, and transmit the screen to the vehicle onboard apparatus.

2. The multimedia reproducing system of claim 1, wherein the reproducing unit includes a plurality of decoders corresponding to a media type and is operable to select a decoder that corresponds to the desired medium.

3. The multimedia reproducing system of claim 1, wherein the reproducing unit includes a decoder and memory operable to store a plurality of decoding programs that correspond to a media type and is operable to select a decoding program that corresponds to the desired medium.

4. The multimedia reproducing system of claim 1, further comprising:
   a data converting unit operable to convert the music data selected at the second client apparatus into data in a predetermined format; and
   wherein the server data transmitting/receiving unit is operable to transmit the music data selected at the vehicle onboard apparatus in the predetermined format to the vehicle onboard apparatus and the reproducing unit utilizes a decoder that corresponds to the predetermined format to apply the decoding to the music data transmitted from the server apparatus by the server data transmitting/receiving unit.

5. The multimedia reproducing system of claim 1 wherein the first client apparatus includes a function selecting unit operable to select an operation mode relating to a reproduction quality, equalization, or notifying the server apparatus of selection content; and
   the server apparatus includes an operation screen generating unit operable to generate an operation screen presented on the vehicle onboard apparatus based on the content of the function selected by said function selecting unit, and transmit the screen to the vehicle onboard apparatus.

6. The multimedia reproducing system of claim 1, wherein the list presenting unit provides the vehicle onboard apparatus with a list of music data prepared by the server apparatus; and
   the server apparatus includes a charging unit operable to conduct purchase processing of selected music data.

7. The multimedia reproducing system of claim 6, wherein the data registering unit registers data relates to selected music data in the user record area.

8. The multimedia reproducing system of claim 1, further comprising:
   a last position storing unit operable to store last position information indicating the last reproduction position by said reproducing unit; and
   a last position managing unit operable to manage reading and writing of the last position information to and from the last position storing unit;
   wherein the data relates to music data selected by the vehicle on board apparatus is reproduced from a position corresponding to the last position information stored in the last position storing unit.

9. The multimedia reproducing system of claim 8, wherein the server data transmitting/receiving unit obtains data corresponding to the music data selected on the vehicle onboard apparatus starting from the position corresponding to the last position information stored in the last position storing unit, and transmits the data to the vehicle onboard apparatus.

10. The multimedia reproducing system of claim 9, further comprising a last position managing unit in the vehicle onboard apparatus, and is operable to transmit the last position information to the server apparatus.

11. The multimedia reproducing system of claim 9, wherein the last position managing unit and the last position storing unit are provided in the server apparatus, and the last position information is stored in the server apparatus.

12. A vehicle onboard apparatus, comprising:
a selecting unit of the vehicle onboard apparatus, the selecting unit operable for a user to select desired music data from a list of music data presented by a server apparatus based on data from different types of media uploaded in advance onto the server apparatus, wherein the music data presented by the server apparatus is music data uploaded in advance onto the server apparatus by the user;
a function selecting unit operable to select an operation mode relating to reproduction quality, equalization, and notifying the server apparatus of selection content;
an operation screen display unit operable to receive an operation screen generated on the server apparatus based on the content of the function selected by the function selecting unit, and present the screen on a display; and
a reproducing unit of the vehicle onboard apparatus, the reproducing unit operable to receive data corresponding to the music data selected by the user at the selecting unit that has been transmitted from the server apparatus in response to selection of the music data by the user, and apply decoding corresponding to a medium;
wherein the selecting unit of the vehicle onboard apparatus is further operable for the user to select and purchase desired music from a list of music data available for purchase at the vehicle onboard apparatus and the reproducing unit of the vehicle onboard apparatus is further operable to receive music data corresponding to the music data of the list of music data available for purchase at the vehicle onboard apparatus selected and purchased by the user at the selecting unit that has been transmitted from the server apparatus in response to selection and purchase of the music data of the list of music data available for purchase at the vehicle onboard apparatus by the user, and applying decoding corresponding to the medium; and
wherein the user is charged for the music data corresponding to the music data of the list of music data available for purchase at the vehicle onboard apparatus selected and purchased by the user based on which mode is selected as a reproduction quality and whether an equalizer function or an interpolated data function are selected.

13. The vehicle onboard apparatus of claim 12, wherein the reproducing unit includes a plurality of decoders corresponding to a media type; and
the decoding is applied to the data transmitted from the server apparatus by utilizing the decoder that corresponds to the medium.

14. The vehicle onboard apparatus of claim 12, wherein the reproducing unit is provided with a decoder that corresponds to a predetermined format and decodes data converted into the predetermined format.

* * * * *